A. WATKINS.
APPARATUS FOR DETERMINING RELATIVE TIMES OF DEVELOPMENT OF PHOTOGRAPHIC PLATES
OR FILMS FOR DIFFERENT TEMPERATURES.
APPLICATION FILED JULY 2, 1908.
933,605.
Patented Sept. 7, 1909.
2 SHEETS—SHEET 1.
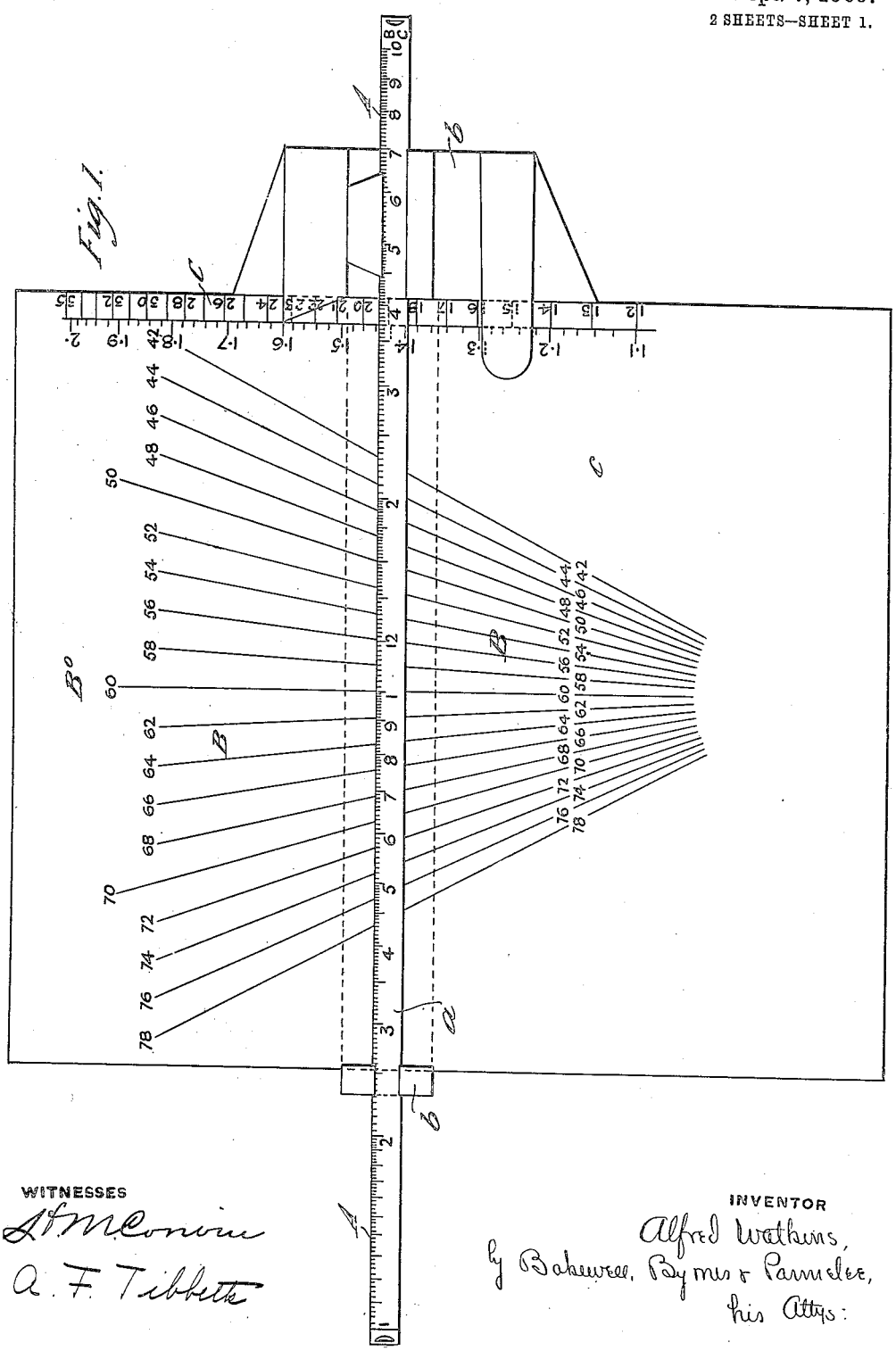

A. WATKINS.
APPARATUS FOR DETERMINING RELATIVE TIMES OF DEVELOPMENT OF PHOTOGRAPHIC PLATES
OR FILMS FOR DIFFERENT TEMPERATURES.
APPLICATION FILED JULY 2, 1908.
933,605.
Patented Sept. 7, 1909.
2 SHEETS—SHEET 2.
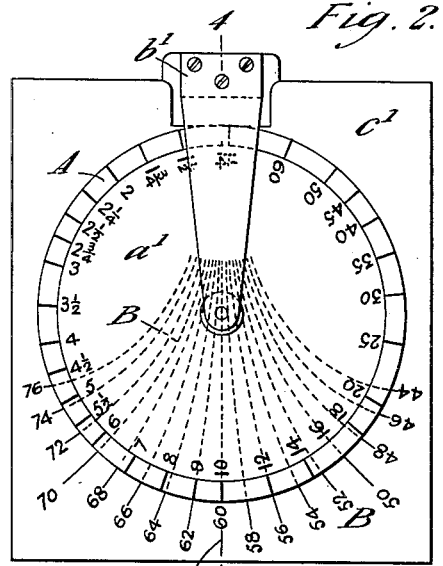
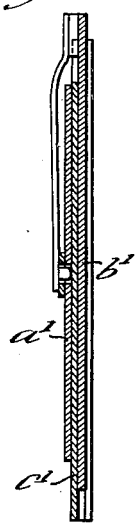
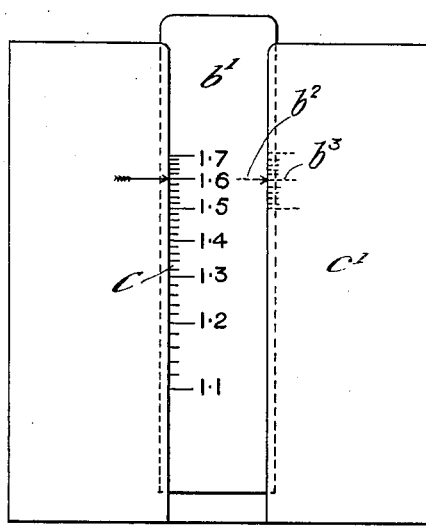
WITNESSES
INVENTOR

UNITED STATES PATENT OFFICE.

ALFRED WATKINS, OF HEREFORD, ENGLAND.

APPARATUS FOR DETERMINING RELATIVE TIMES OF DEVELOPMENT OF PHOTOGRAPHIC PLATES OR FILMS FOR DIFFERENT TEMPERATURES.

933,605.

Specification of Letters Patent.   Patented Sept. 7, 1909.

Application filed July 2, 1908. Serial No. 441,657.

*To all whom it may concern:*

Be it known that I, ALFRED WATKINS, a subject of the King of Great Britain, residing at The Imperial Mills, Hereford, in the county of Hereford, England, photographic-apparatus manufacturer, have invented certain new and useful Improvements in an Apparatus for Determining the Relative Times of Development of Photographic Plates or Films for Different Temperatures, of which the following is a specification.

It is well known that the rate or speed of development of photographic films or plates varies with the temperature in a manner which is very approximately represented for ordinary ranges of temperature by the equation:—

$$^v(T+t) = V_T \times k^t$$

where $V_T$ denotes the speed of development at T° C. $^v(T+t)$ denotes the speed of development at $(T+t)$ °C. and $k$ denotes the temperature coefficient for 1° C. If, therefore, the speed of development of a given plate is determined experimentally for a given developer at two different temperatures, the temperature coefficient for that developer and plate can be calculated, and the value obtained used to determine the speed of development or relative time of development for other temperatures.

The present invention has for its object to provide an apparatus, by means of which the relative time of development for any temperature can be quickly ascertained when the correct time of development for a given temperature is known. The apparatus comprises two relatively movable scales, one of which is a logarithmic scale representing times or duration of development, and the other an equal division degree scale the length or value of the divisions of which is determined by the value of the temperature coefficient proper to the plate and developer used. By setting the scales with the division corresponding to the known time of development at a given temperature in register with the division representing that temperature, the relative time of development for any other temperature can be immediately read off.

For developers which are sent out in liquid form one scale may conveniently be pasted around the bottle and the other displayed on a band encircling the bottle and rotatable thereon. The value of the temperature scale divisions would be that proper to the temperature coefficient for the developer contained in the bottle.

For developers which are sent out in other kinds of packages the movable scale might be displayed around the edge of a circular disk rotatable concentrically with the fixed scale; or a translationally movable scale might be provided as for example if the package is of ordinary match-box form one side of the casing may be slotted to expose a scale displayed along the side of the drawer or box, the other scale being along the edge of the slot.

When a thermometer is supplied as part of the apparatus the scale of the thermometer itself may be used as the temperature scale with respect to which the logarithmic scale is set.

The invention is illustrated as applied to a calculator adapted to be used for different temperature coefficients, Figure 1 showing a translationally adjustable form of the apparatus and Figs. 2, 3 and 4 a rotary form, Figs. 2 and 3 being respectively front and rear views and Fig. 4 a section on line 4—4 of Fig. 2.

The temperature scale consists of a series of lines B equally disposed and radiating from a point, and the logarithmic scale A constituted by a series of divisional lines is arranged to be adjustable longitudinally as well as transversely to these lines so that it can be read with respect to temperature scales having different constants. To facilitate setting the logarithmic scale to the proper distance along the radiating lines, an auxiliary scale C of temperature coefficient values may be provided with respect to which one or other of the scales of the calculator is first set. When the logarithmic scale A is on a straight bar $a$ (Fig. 1), translationally movable longitudinally in a frame $b$ which itself is adjustably mounted on the plate $c$ carrying the temperature scale so that the bar $a$ can be moved in the frame across the plate $c$ and with the frame along the plate $c$, the radiating lines B of the temperature scale would be straight, but when the logarithmic scale A is displaced on a rotatable disk $a'$ (Figs. 2 and 4) movable along the radiating temperature lines, these lines B are curved outwardly from a straight standard temperature line B°. In both cases the scale of temperature represented by the intersection of the edge of the bar $a$ or disk $a'$ with the radiating temperature lines B must be an equal division scale, or only depart therefrom in accordance with divergence of the law connecting speed of development and temperature from that given at the beginning of the present specification.

In the rotary apparatus the disk $a'$ is mounted on a slide $b'$ which is adjustable translationally on the plate $c'$ carrying the temperature scale in such manner that the center of the disk moves along the straight or standard line $B°$ of the temperature scale. In this case the scale C of temperature coefficients is more conveniently engraved or otherwise displayed on the rear face of the slide $b'$ and set with respect to a fiducial mark on the rear face of the plate $c'$ as shown in Fig. 3, or alternatively the scale C may be on the plate and the fiducial mark on the slide, as shown respectively in broken lines at $b^2$ and $b^3$.

As shown in the drawings the temperature scale B is in Fahrenheit degrees and the temperature coefficient numerics are those proper to 10° F.

Having thus described the nature of my said invention and the best means I know of carrying the same into practical effect, I claim:—

1. An apparatus for determining the relative times of development of photographic plates or films for different temperatures by the coöperation of two relatively movable scales, consisting of a scale member having thereon a series of lines constituting an equal division scale representing degrees of temperature, a second scale member bearing a single scale comprising a series of divisional lines constituting a logarithmic scale representing times of development, which divisional lines coöperate with the lines on the first scale member to indicate the times of development, and means for adjusting one scale member with respect to the other; substantially as described.

2. An apparatus for determining the relative times of development of photographic plates or films for different temperatures by the coöperation of two relatively movable scales, consisting of a scale member having thereon a series of radiating lines constituting an equal division scale representing degrees of temperature, a second scale member bearing a single scale comprising a series of divisional lines constituting a logarithmic scale representing times of development, which divisional lines coöperate with said radiating lines to indicate the times of development, and means for adjusting one scale member with respect to the other; substantially as described.

3. In apparatus for determining the relative times of development of photographic plates or films for different temperatures by the coöperation of two relatively movable scales consisting of a scale member having thereon a series of radiating lines constituting an equal division scale representing degrees of temperature and a second series of lines constituting a second scale representing temperature co-efficients, a second scale member bearing a single scale comprising a series of divisional lines constituting a logarithmic scale representing times of development which divisional lines are adapted to coöperate with said radiating lines to indicate the times of development, means for adjusting the second scale member with respect to the said second scale of the first scale member and means for adjusting the second scale member also with respect to the said equal division scale on the said first scale member; substantially as described.

In testimony whereof I have signed my name to this specification in the presence of two subscribing witnesses.

ALFRED WATKINS.

Witnesses:
CHARLES BRINDLEY BEDDOE,
OWEN LEVI BRADLEY.